(12) United States Patent
Sarrasin

(10) Patent No.: US 11,348,503 B2
(45) Date of Patent: May 31, 2022

(54) METHOD FOR TRANSMITTING A MONOCHROME DIGITAL IMAGE VIA A TRANSMISSION INTERFACE INCLUDING A PLURALITY OF TRANSMISSION CHANNELS

(71) Applicant: COMMISSARIAT A L'ENERGIE ATOMIQUE ET AUX ENERGIES ALTERNATIVES, Paris (FR)

(72) Inventor: Denis Sarrasin, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/046,211

(22) PCT Filed: Apr. 9, 2019

(86) PCT No.: PCT/EP2019/058908
§ 371 (c)(1),
(2) Date: Oct. 8, 2020

(87) PCT Pub. No.: WO2019/197379
PCT Pub. Date: Oct. 17, 2019

(65) Prior Publication Data
US 2021/0074197 A1 Mar. 11, 2021

(30) Foreign Application Priority Data
Apr. 9, 2018 (FR) .................................. 1853066

(51) Int. Cl.
*G09G 3/20* (2006.01)
*H04N 1/40* (2006.01)
(Continued)

(52) U.S. Cl.
CPC ........... *G09G 3/20* (2013.01); *H04N 1/40012* (2013.01); *H04N 9/43* (2013.01); *G09G 5/028* (2013.01);
(Continued)

(58) Field of Classification Search
CPC ...... G09G 3/20; G09G 5/028; G09G 2340/08; G09G 2340/14; G09G 2370/02;
(Continued)

(56) References Cited

U.S. PATENT DOCUMENTS 6,700,559 B1 * 3/2004 Tanaka ................. G09G 3/3611
345/600
2003/0071775 A1 * 4/2003 Ohashi ................. G09G 3/3607
345/600
(Continued)

OTHER PUBLICATIONS

International Search Report as issued in International Patent Application No. PCT/EP2019/058908, dated Jun. 26, 2019.
(Continued)

*Primary Examiner* — Brent D Castiaux
(74) *Attorney, Agent, or Firm* — Pillsbury Winthrop Shaw Pittman LLP

(57) ABSTRACT

A method for transmitting a monochrome digital image from a digital image source connected to a monochrome scrZeen by a transmission interface including a plurality of transmission channels, the monochrome image including a plurality of image pixels, the monochrome screen including a plurality of display pixels, the method including dividing the image pixels into a plurality of pixel groups; successively transmitting the pixel groups from the digital image source to the monochrome screen via the transmission interface, the image pixels of each group of pixels being transmitted in parallel via the transmission channels; assigning each image pixel received by the monochrome screen to a corresponding
(Continued)

display pixel in such a way as to reconstruct the digital image on the monochrome screen.

9 Claims, 1 Drawing Sheet

(51) Int. Cl.
    *H04N 9/43*     (2006.01)
    *G09G 5/02*     (2006.01)
    *H04N 1/46*     (2006.01)

(52) U.S. Cl.
    CPC ..... *G09G 2340/08* (2013.01); *G09G 2340/14* (2013.01); *G09G 2370/02* (2013.01); *G09G 2370/08* (2013.01); *H04N 1/465* (2013.01)

(58) Field of Classification Search
    CPC .. G09G 2370/08; G09G 2370/00; H04N 9/43; H04N 1/40012; H04N 1/465
    See application file for complete search history.

(56) References Cited

U.S. PATENT DOCUMENTS

| | | | |
|---|---|---|---|
| 2006/0023967 A1 | 2/2006 | Hayashi et al. | |
| 2010/0013755 A1* | 1/2010 | Chiou | G09G 3/3648 |
| | | | 345/87 |
| 2010/0109992 A1* | 5/2010 | Sumi | G09G 3/3648 |
| | | | 345/89 |
| 2013/0216137 A1* | 8/2013 | Washio | H04N 1/4092 |
| | | | 382/199 |
| 2017/0098408 A1* | 4/2017 | Hsieh | G09G 3/2074 |

OTHER PUBLICATIONS

Wright, S. L., et al., "25.4: Color and Luminance Management for High-Resolution Liquid-Crystal Displays," SID International Symposium, Digest of Technical Papers, vol. 34, No. 1, Jan. 2003, XP055533395, pp. 940-943.

* cited by examiner

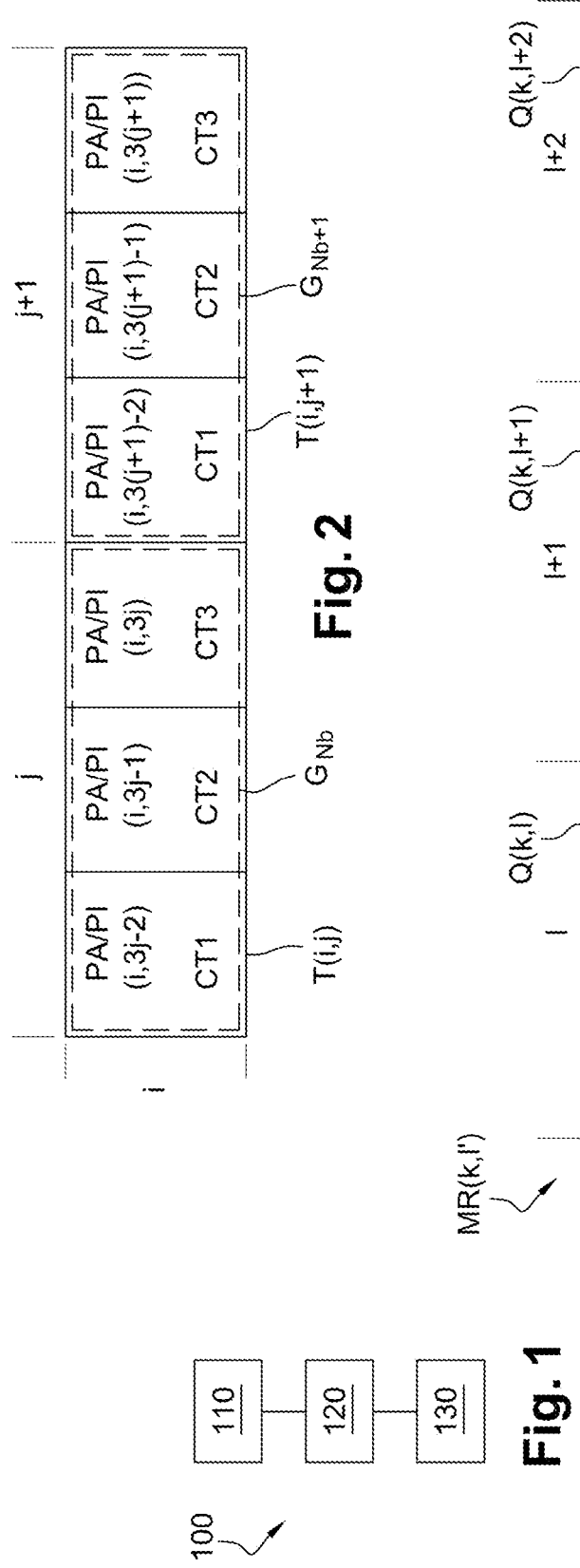
Fig. 2
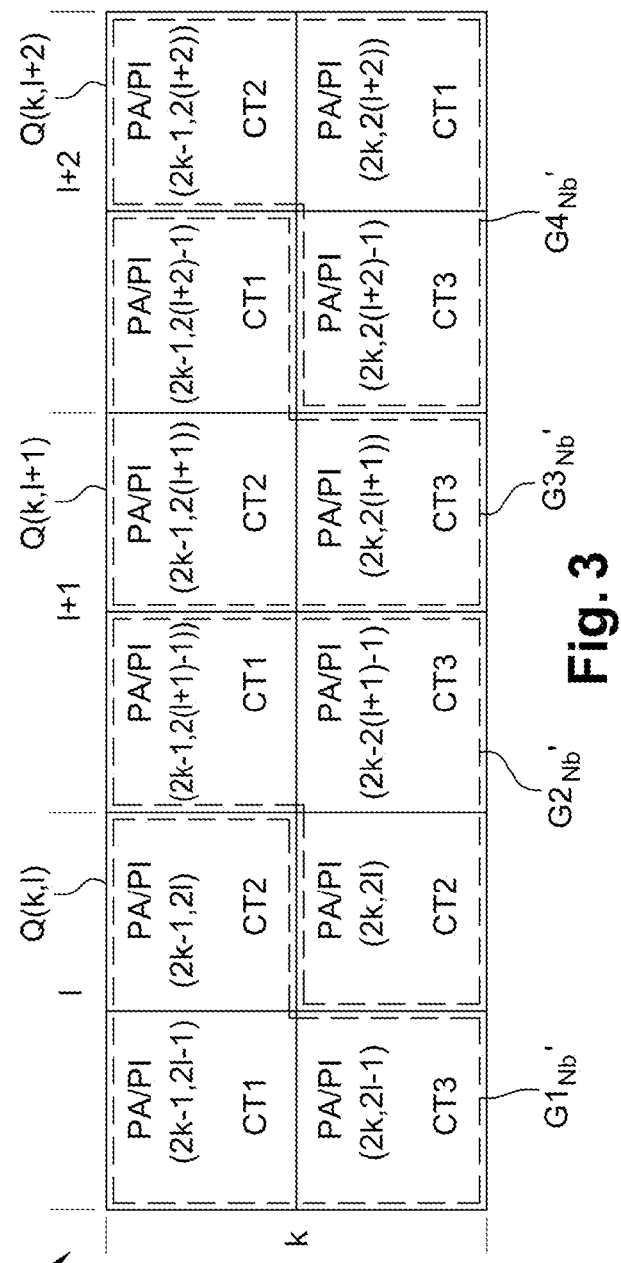
Fig. 3
Fig. 1

METHOD FOR TRANSMITTING A MONOCHROME DIGITAL IMAGE VIA A TRANSMISSION INTERFACE INCLUDING A PLURALITY OF TRANSMISSION CHANNELS

CROSS-REFERENCE TO RELATED APPLICATIONS

This application is the U.S. National Stage of PCT/EP2019/058908, filed Apr. 9, 2019, which in turn claims priority to French patent application number 1853066 filed Apr. 9, 2018. The content of these applications are incorporated herein by reference in their entireties.

TECHNICAL FIELD OF THE INVENTION

The present invention relates to a method for transmitting a monochrome digital image via a transmission interface including a plurality of transmission channels.

PRIOR ART OF THE INVENTION

A digital image is constituted by a multitude of pixels arranged in the form of a matrix. Conventionally, each pixel is coded on three components that each correspond to a primary colour, generally red, green and blue. This is referred to in this case as RGB coding.

The digital image is transmitted from a source of digital images to a screen by means of an interface comprising three transmission channels, each transmission channel being dedicated to one of the colour components. The three pieces of colour information of each pixel can then be transmitted in parallel.

Once received by the screen, the digital colour image can be transformed into a monochrome image. To do this, a level of light intensity E'y is calculated for each pixel from the three components R, G and B according to the following equation:

$$E'y = 0.299 \times R + 0.587 \times G + 0.114 \times B$$

However, to date there is no method for directly transmitting to a monochrome screen a monochrome digital image from a digital image source. There is therefore a need for such a method.

SUMMARY OF THE INVENTION

The present invention aims to respond to this need by proposing a method for transmitting a monochrome digital image from a digital image source connected to a monochrome screen by means of a transmission interface including a plurality of transmission channels, the monochrome image including a plurality of image pixels, the monochrome screen including a plurality of display pixels, the method including the following steps:
  dividing the image pixels into a plurality of pixel groups;
  successively transmitting the pixel groups from the digital image source to the monochrome screen via the transmission interface, the image pixels of each group of pixels being transmitted in parallel via the transmission channels;
  assigning each image pixel received by the monochrome screen to a corresponding display pixel in such a way as to reconstruct the digital image on the monochrome screen.

The method according to the invention can also include one or several characteristics among the following considered individually or according to any technically possible combinations.

According to an embodiment, the transmission interface includes three transmission channels, each group of pixels including three image pixels.

According to an embodiment, the display pixels of the monochrome screen form a display matrix, the display pixels being arranged in such a way as to form sets of three pixels called "triplets", each triplet being a sub-matrix of dimensions (1,3) of the display matrix, the triplets forming a secondary matrix of dimensions (M,N), the image pixels being divided in such a way that each group of pixels is directly assigned to a corresponding triplet.

According to an embodiment, each group of pixels is identified by an identification number Nb defined by the following equation:

$$Nb = N.(i-1) + j$$

where i and j are integers varying respectively from 1 to M and from 1 to N, the pixel groups being transmitted in increasing order of identification numbers.

According to an embodiment, the display pixels having an identical position in each triplet are associated with the same transmission channel.

According to an embodiment, the display pixels of the monochrome screen form a display matrix, the display pixels being arranged in such a way as to form sets of four pixels called "quadruplets", each quadruplet being a square sub-matrix of dimension 2 of the display matrix, the quadruplets forming a secondary matrix of dimensions (M',N'), the image pixels being divided in such a way as to form repetitive patterns with each one comprising four pixel groups, the image pixels of each repetitive pattern being assigned to the display pixels of three consecutive quadruplets belonging to the same line of the secondary matrix.

According to an embodiment, each repetitive pattern is identified by an identification number Nb' defined by the following equation:

$$Nb' = N'.(k-1) + 1'$$

where k and l' are integers varying respectively from 1 to M' and from 1 to N'/3, the repetitive pattern MR(k, l') including a first group of pixels $G1_{Nb'}$, a second group of pixels $G2_{Nb'}$, a third group of pixels $G3_{Nb'}$, and a fourth group of pixels $G4_{Nb'}$, such that:
  $G1_{Nb'} \ni \{PI(2k-1, 2l-1); PI(2k-1, 2l); PI(2k, 2l-1)\}$;
  $G2_{Nb'} \ni \{PI(2k, 2l); PI(2k-1, 2(l+1)-1); PI(2k, 2(l+1)-1)\}$;
  $G3_{Nb'} \ni \{PI(2k-1, 2(l+1)); PI(2k, 2(l+1)); PI(2k-1, 2(l+2)-1)\}$;
  $G4_{Nb'} \ni \{PI(2k, 2(l+2)-1); PI(2k-1, 2(l+2)); PI(2k, 2(l+2))\}$;
where l=3l'-2.

According to an embodiment, the repetitive patterns are transmitted in increasing order of identification numbers.

According to an embodiment, three of the four display pixels of each quadruplet are each associated with a transmission channel, the display pixels associated with the same transmission channel having an identical position in each quadruplet.

BRIEF DESCRIPTION OF THE FIGURES

The invention and its different applications will be understood better when reading the following description and when examining the accompanying figures, along which:

FIG. 1 is a functional diagram of an embodiment of the method according to the invention;

FIG. 2 shows a first embodiment of the method according to the invention;

FIG. 3 shows a second embodiment of the method according to the invention.

The figures are shown only as an indication and in no way limit the invention.

For increased clarity, identical or similar elements are marked with identical reference signs on all the figures.

DETAILED DESCRIPTION OF EMBODIMENTS OF THE INVENTION

FIG. 1 shows a method for transmitting 100 a monochrome digital image, according to an embodiment of the invention. The monochrome digital image includes image pixels arranged in the form of an image matrix of dimensions (X,Y), i.e. comprising X lines and Y columns, X and Y being strictly positive integers. The monochrome digital image has a definition XY equal to the number of image pixels that it includes, i.e. to the product of the number X of lines by the number Y of columns of the image matrix. As the digital image is monochrome, each image pixel is coded on a single component corresponding to a level of light intensity.

The monochrome digital image comes from a source of digital images such as a computer, a digital camera or a multimedia player. The source of images is connected to a monochrome screen via a transmission interface including several transmission channels. The transmission interface used is an existing interface designed to transmit digital colour images. The pixels of a digital colour image are coded on several components that define a colour space. Conventionally, this colour space is defined by three primary colours such as red, green and blue (RGB). Preferably, the transmission interface therefore includes a first transmission channel CT1, a second transmission channel CT2 and a third transmission channel CT3. In such an interface, when working with digital colour images, each transmission channel is dedicated to the transmission of one of the colour components. The transmission interface is for example of the VGA ("Video Graphics Array"), DVI ("Digital Visual Interface), HDMI ("High-Definition Multimedia Interface") or DisplayPort type.

The monochrome screen includes an electronic circuit comprising a display matrix composed of display pixels and means for addressing display pixels. The display pixels are hardware elements configured to emit light according to the level of light intensity coded in the image pixels. The means for addressing make it possible to access the display pixels in order to provide them with the image pixels received via the transmission channels.

In the context of the invention, the display circuit of the monochrome screen is advantageously similar to that of a colour screen wherein each display pixel includes several sub-pixels of which at least one sub-pixel for each colour component. These sub-pixels are generally carried out by means of a LCD valve placed in front of a source of white light, by means of light-emitting diodes that emit in the red, green or blue wavelengths, or by means of light-emitting diodes emitting a white light on top of which colour filters are disposed so as to obtain the emission of the desired colours. In this latter case, the display circuit of the monochrome screen can therefore be obtained by suppressing these colour filters. The sub-pixels of the colour screen then become full-fledged pixels in the monochrome screen and the means for addressing remain unchanged. An advantage from an existing display circuit is that it is not necessary in this case to develop a specific display circuit in order to carry out the monochrome screen.

With the purpose of simplifying the description and facilitating comprehension, it is considered in what follows that the image matrix and the display matrix have identical dimensions, i.e. they both include the same number X of lines and the same number Y of columns. It is obvious that those skilled in the art will understand that the matrices can have different dimensions, the definition of the digital image able for example to be less than that of the monochrome screen, and will then know how to consequently adapt the invention.

The method for transmitting 100 includes a first step 110 during which the pixels of the monochrome digital image are divided into pixel groups. This first step 110 consists of preparing the image pixels to be sent to the monochrome screen. Advantageously, the image pixels are divided into a number of groups equal to the number of transmission channels. It is thus possible to simultaneously transmit as many pixels as there are transmission channels which makes it possible, for the same clock frequency, to maximise the number of pixels transmitted. Here, the pixel groups each include three image pixels. The first step 110 is carried out at the source of images by suitably programming the sending of the pixels, as described in more detail in the following embodiments. Dividing into pixel groups is therefore done on different image pixels.

Then, during a second step 120, the pixel groups are successively transmitted from the digital image source to the monochrome screen via the transmission interface. The image pixels belonging to the same pixel group are transmitted in parallel via the different transmission channels.

The method of transmission also includes a third step 130 of assigning each image pixel received by the monochrome screen to a corresponding display pixel. In other terms, it entails having the pixels of the digital image correspond with the pixels of the monochrome screen in such a way as to display the digital image. The third step 130 takes place at the monochrome screen by suitably controlling the means of addressing.

In the context of the invention, "assigning an image pixel to a display pixel" means the operation consisting of providing the display pixel with the coded information concerning the level of light intensity contained in the pixel of the digital image.

In relation to the transmission of a colour image, the quantity of monochrome data transmitted thanks to the invention can be multiplied up to a ratio of 3 for the same clock frequency. As transmission channels are limited in frequency, the invention therefore makes it possible to transmit monochrome digital images that have higher definitions than those of digital colour images that would be transmitted by the same transmission channels. The invention is particularly interesting for applications where image definition is more important than colour.

As such, the present invention has a particularly interesting application in the field of miniature screens, also called "microdisplays", for which the highest possible definitions are sought.

By way of example, the transmission of digital colour images to a colour screen that has a definition of 1280×1024 and at a frequency of 60 Hz is done at a pixel frequency of 91 MHz according to the VESA (Video Electronics Standards Association) standard. At this same frequency, the invention can make it possible to transmit a monochrome image that has a definition of 3840×1024.

Another advantage of the invention is the possibility of working at a lower frequency while retaining the same image definition, which makes it possible in particular to reduce the electrical energy consumption.

A first embodiment of the invention shall now be described in reference to FIG. 2. In this embodiment, the display pixels PA of the monochrome screen are arranged in such a way as to form triplets T, i.e. sets of three display pixels PA. In a colour version of such a monochrome screen, each display pixel PA of a triplet T would be for example intended to display one of the three colour components of a pixel of a digital colour image.

The triplets T form a secondary matrix of dimensions (M,N), M and N being strictly positive integers. Each triplet T can be identified by a line index i and a column index j, i and j being integers respectively between 1 and M (i∈[1; M]) and between 1 and N (j∈[1; N]). Each triplet T is for example composed of three consecutive display pixels PA that belong to the same line of the display matrix. In other words, each triplet T is a sub-matrix of dimensions (1,3) of the display matrix. The secondary matrix therefore includes the same number of lines as the display matrix (M=X) and a number of columns equal to a third of the number of columns of the display matrix (N=Y/3). For example, each triplet T(i, j) includes a first display pixel PA(i, 3j-2), a second display pixel PA(i, 3j-1) and a third display pixel PA(i, 3j).

The triplets T include the same number of pixels as the pixel groups transmitted via the transmission channels. Each pixel group is therefore advantageously formed in such a way as to be able to be directly assigned to the corresponding triplet T. Consequently, each group of pixels includes the three pixels PI of the digital image having the same coordinates as the three display pixels PA of the corresponding triplet T. From a mathematical standpoint, the pixel groups $G_{Nb}$ and the image pixels PI that they contain respect the following relationship:

$$G_{Nb} \ni \{PI(i, 3j-2); PI(i, 3j-1); PI(i, 3j)\}$$

where Nb is an identification number of each group G, Nb being defined by the following equation:

$$Nb=N.(i-1)+j$$

for j varying from 1 to N and i varying from 1 to M.

The pixel groups $G_{Nb}$ are preferably transmitted in increasing order of the identification numbers Nb, i.e. by increasing column index j in such a way as to display a complete line, then by increasing line index i.

Advantageously, the display pixels PA having an identical position in each triplet T are associated with the same transmission channel. In other words, all the display pixels PA having the same position in the triplets T receive image pixels PI transmitted by the same transmission channel. Thus, the step 130 of assigning image pixels is simplified. For example, the first display pixel PA(i, 3j-2), the second display pixel PA(i, 3j-1) and the third display pixel PA(i, 3j) of each triplet T(i,j) are associated respectively with the first transmission channel CT1, with the second transmission channel CT2 and with the third transmission channel CT3, as shown in FIG. 2.

A second embodiment of the invention shall be described in reference to FIG. 3. In this embodiment, the display pixels PA of the monochrome screen are arranged in such a way as to form quadruplets Q, i.e. sets of four pixels. In a colour version of such a monochrome screen, three of the display pixels PA of a quadruplet Q would for example be intended to display a colour component of a pixel of a digital colour image. The remaining display pixel PA could be used to display a second time for example the blue colour component if it is less luminous than the others, or to emit white light so as to increase the luminosity of the pixel.

The quadruplets Q form a secondary matrix of dimensions (M',N'), M' and N' being strictly positive integers. Each quadruplet Q can be identified by a line index k and a column index l, k and l being integers respectively between 1 and M' (k∈[1; M']) and between 1 and N' (l∈[1; N']). Each quadruplet Q is a square sub-matrix of dimension 2 of the display matrix. Consequently, the number of lines of the secondary matrix is equal to half the number of lines as the display matrix (M'=X/2) and the number of columns of the secondary matrix is equal to half the number of columns of the display matrix (N'=Y/2). For example, each quadruplet Q(k,l) includes a first display pixel PA(2k-1, 2l-1), a second display pixel PA(2k-1, 2l), a third display pixel PA(2k, 2l-1) and a fourth display pixel PA(2k, 2l).

A quadruplet Q includes one pixel more than a pixel group transmitted via the transmission channels. A single pixel group is therefore not sufficient to completely fill a quadruplet Q. On the other hand, three quadruplets Q include a total number of pixels equivalent to that of four pixel groups. The image pixels PI are therefore advantageously divided in such a way as to form repetitive patterns MR with each one comprising four pixel groups, each repetitive pattern MR corresponding to three consecutive quadruplets Q belonging to the same line of the secondary matrix. In this case, each repetitive pattern MR can be identified by the line index k and a column index l' which is an integer between 1 and N'/3 (l'∈[1; N'/3]). Each repetitive pattern MR(k, l') therefore includes a first quadruplet Q(k,l), a second quadruplet Q(k, l+1) and a third quadruplet Q(k,l+2) where l and l' are linked by the following relationship:

$$l=3l'-2.$$

The repetitive pattern MR(k,l') includes for example a first group $G1_{Nb'}$, a second group $G2_{Nb'}$, a third group $G3_{Nb'}$ and a fourth group $G4_{Nb'}$ such that:

$G1_{Nb'} \ni \{PI(2k-1, 2l-1); PI(2k-1, 2l); PI(2k, 2l-1)\}$;

$G2_{Nb'} \ni \{PI(2k, 2l); PI(2k-1, 2(l+1)-1); PI(2k, 2(l+1)-1)\}$;

$G3_{Nb'} \ni \{PI(2k-1,2(l+1)); PI(2k, 2(l+1)); PI(2k-1,2(l+2)-1)\}$;

$G4_{Nb'} \ni \{PI(2k, 2(l+2)-1); PI(2k-1,2(l+2)); PI(2k, 2(l+2))\}$;

where Nb' is an identification number of each repetitive pattern MR, Nb' being defined by the following equation:

$$Nb'=N'.(k-1)+l'$$

for l' varying from 1 to N'/3 and k varying from 1 to M'.

The four pixel groups forming the repetitive pattern MR are preferably transmitted in order, i.e. from the first to the fourth. Likewise, the repetitive patterns MR are preferably transmitted by increasing order of number Nb' in such a way as to display the lines of the image two by two. Note that in this embodiment, the monochrome screen is advantageously equipped with a line memory that makes it possible to store the image pixels PI received until the full transmission of two consecutive lines of the digital image.

Advantageously, three of the four display pixels PA of each quadruplet Q are each associated with a transmission channel CT1, CT2, CT3, the display pixels PA associated with the same transmission channel CT1, CT2, CT3 having an identical position in each quadruplet Q. In other words, three of the four display pixels PA of each quadruplet Q receive image pixels PI transmitted by their respective transmission channel, which is always the same. Thus, the step of assigning pixels of the digital image is simplified. On the other hand, the remaining display pixel PA receives an image pixel PI via a transmission channel that varies according to the coordinates of the quadruplet Q.

For example, the first display pixel PA(2k−1, 2l−1), the second display pixel PA(2k−1, 2l) and the third display pixel PA(2k, 2l−1) of each quadruplet Q(k,l) are associated respectively with the first transmission channel CT1, with the second transmission channel CT2 and with the third transmission channel CT3. In this case, it is the fourth display pixel PA(2k, 2l) that receives its image pixel PI via a variable transmission channel, as shown in FIG. 3.

In this embodiment, each group of pixels includes at the maximum a single image pixel PI(2k, 2l) which is assigned to a fourth display pixel PA(2k, 2l) of a quadruplet Q(k,l). Consequently, the variable transmission channel corresponds to the one that is not used for transmitting the two other image pixels PI of the same pixel group.

Naturally, the invention is not limited to the embodiments described in reference to the figures and alternatives could be considered without leaving the scope of the invention.

The invention claimed is:

1. A method for transmitting a monochrome digital image from a digital image source connected to a monochrome screen by a transmission interface including a plurality of transmission channels, the monochrome image including a plurality of image pixels, the monochrome screen including a plurality of display pixels, the method comprising:
dividing the image pixels into a plurality of image pixel groups, each image pixel group comprising a number of image pixels equal to a number of transmission channels;
after said dividing, successively transmitting the image pixel groups from the digital image source to the monochrome screen via the transmission interface, the image pixels of each group of image pixels being transmitted in parallel via the transmission channels;
assigning each image pixel received by the monochrome screen to a corresponding one display pixel in such a way as to reconstruct the digital image on the monochrome screen.

2. The method for transmitting according to claim 1, wherein the transmission interface includes three transmission channels, each group of image pixels including three image pixels.

3. The method for transmitting according to claim 1, wherein the display pixels of the monochrome screen form a display matrix, the display pixels being arranged in such a way as to form sets of three pixels forming triplets, each triplet being a sub-matrix of dimensions of the display matrix, the triplets forming a secondary matrix of dimensions, the image pixels being divided in such a way that each group of pixels is directly assigned to a corresponding triplet.

4. The method for transmitting according to claim 3, wherein each group of image pixels is identified by an identification number Nb defined by the following equation:

$$Nb = N \cdot (i-1) + j$$

where i and j are integers varying respectively from 1 to M and from 1 to N, the pixel groups being transmitted in increasing order of identification numbers.

5. The method for transmitting according to claim 3, wherein the display pixels having an identical position in each triplet are associated with the same transmission channel.

6. The method for transmitting according to claim 1, wherein the display pixels of the monochrome screen form a display matrix, the display pixels being arranged in such a way as to form sets of four pixels forming quadruplets, each quadruplet being a square sub-matrix of dimension 2 of the display matrix, the quadruplets forming a secondary matrix of dimensions, the image pixels being divided in such a way as to form repetitive patterns with each one comprising four pixel groups, the image pixels of each repetitive pattern being assigned to the display pixels of three consecutive quadruplets belonging to a same line of the secondary matrix.

7. The method for transmitting according to claim 6, wherein each repetitive pattern is identified by an identification number Nb' defined by the following equation:

$$Nb' = N' \cdot (k-1) + l'$$

where k and l' are integers varying respectively from 1 to M' and from 1 to N'/3, the repetitive pattern MR(k, l') including a first group of pixels $G1_{Nb'}$, a second group of pixels $G2_{NB'}$, a third group of pixels $G3_{Nb'}$, and a fourth group of pixels $G4_{Nb'}$, such that:
$G1_{Nb'} \ni \{PI(2k-1,2l-1); PI(2k-1, 2l); PI(2k, 2l-1)\}$;
$G2_{Nb'} \ni \{PI(2k, 2l); PI(2k-1, 2(l+1)-1); PI(2k, 2(l+1)-1)\}$;
$G3_{Nb'} \ni \{PI(2k-1, 2(l+1)); PI(2k, 2(l+1)); PI(2k-1, 2(l+2)-1)\}$;
$G4_{Nb'} \ni \{PI(2k, 2(l+2)-1); PI(2k-1, 2(l+2)); PI(2k, 2(l+2))\}$;
where $l = 3l' - 2$.

8. The method for transmitting according to claim 7, wherein the repetitive patterns are transmitted in increasing order of identification numbers.

9. The method for transmitting according to claim 6, wherein three of the four display pixels of each quadruplet are each associated with a transmission channel, the display pixels associated with the same transmission channel having an identical position in each quadruplet.

* * * * *

UNITED STATES PATENT AND TRADEMARK OFFICE
CERTIFICATE OF CORRECTION

PATENT NO. : 11,348,503 B2
APPLICATION NO. : 17/046211
DATED : May 31, 2022
INVENTOR(S) : Denis Sarrasin It is certified that error appears in the above-identified patent and that said Letters Patent is hereby corrected as shown below:

On the Title Page

In Item (57) Abstract, Line 2 should read:
A method for transmitting a monochrome digital image from a digital image source connected to a monochrome screen by a transmission interface including a plurality of transmission channels, the monochrome image including a plurality of image pixels, the monochrome screen including a plurality of display pixels, the method including dividing the image pixels into a plurality of pixel groups; successively transmitting the pixel groups from the digital image source to the monochrome screen via the transmission interface, the image pixels of each group of pixels being transmitted in parallel via the transmission channels; assigning each image pixel received by the monochrome screen to a corresponding display pixel in such a way as to reconstruct the digital image on the monochrome screen.

Signed and Sealed this
Twelfth Day of July, 2022

Katherine Kelly Vidal
*Director of the United States Patent and Trademark Office*